United States Patent
Harrigan et al.

(10) Patent No.: US 11,079,211 B2
(45) Date of Patent: Aug. 3, 2021

(54) CALIPER TOOL AND SENSOR FOR USE IN HIGH PRESSURE ENVIRONMENTS

(71) Applicant: Halliburton Energy Services, Inc., Houston, TX (US)

(72) Inventors: Edward Harrigan, Richmond, TX (US); Michael Simmons, Houston, TX (US); Laurence T. Wisniewski, Houston, TX (US); Abbas Arian, Houston, TX (US); Gary Lee Fickert, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 133 days.

(21) Appl. No.: 16/440,712

(22) Filed: Jun. 13, 2019

(65) Prior Publication Data

US 2020/0049481 A1 Feb. 13, 2020

Related U.S. Application Data

(60) Provisional application No. 62/715,735, filed on Aug. 7, 2018.

(51) Int. Cl.
*G01B 7/13* (2006.01)
*E21B 47/08* (2012.01)

(52) U.S. Cl.
CPC .............. *G01B 7/13* (2013.01); *E21B 47/08* (2013.01)

(58) Field of Classification Search
CPC ........ E21B 47/09; E21B 47/08; E21B 47/085; G01D 5/2291; H01F 27/288; H01F 27/324; H01F 38/14; G01R 29/08; G01R 33/02; G01B 7/13; G01B 7/281
See application file for complete search history.

(56) References Cited

U.S. PATENT DOCUMENTS

| | | | | |
|---|---|---|---|---|
| 4,362,990 A | * | 12/1982 | Schneider | H01F 38/20 324/117 R |
| 5,216,364 A | * | 6/1993 | Ko | B60G 17/01933 324/207.17 |
| 5,504,427 A | * | 4/1996 | Cooper | G01B 7/30 324/207.13 |
| 5,701,114 A | * | 12/1997 | Chass | G01D 5/2291 336/115 |
| 6,560,889 B1 | | 5/2003 | Lechen | |
| 6,647,637 B2 | | 11/2003 | Lechen | |
| 8,044,754 B2 | * | 10/2011 | Ouyang | H01F 27/2885 336/182 |
| 2002/0175677 A1 | * | 11/2002 | Proksch | G01D 5/2066 324/207.18 |
| 2015/0323697 A1 | | 11/2015 | Ohmer et al. | |

(Continued)

*Primary Examiner* — Tung X Nguyen
*Assistant Examiner* — Feba Pothen
(74) *Attorney, Agent, or Firm* — John Wustenberg; C Tumey Law Group PLLC

(57) ABSTRACT

A caliper tool for measuring a shape of a wellbore may include a sensor assembly and a movable measurement component including a hub and a measurement arm extending from the hub, and a magnetically-permeable target coupled to the hub and configured to rotate with the hub upon movement of the measurement arm. A sensor assembly includes primary coil and one or more secondary coils spaced apart from the primary coil, wherein output signals from the secondary coils facilitates measurement of the shape of the wellbore.

18 Claims, 10 Drawing Sheets

(56) References Cited

U.S. PATENT DOCUMENTS

| | | | | |
|---|---|---|---|---|
| 2018/0172418 A1* | 6/2018 | Ohmer | ............... | G01B 5/12 |
| 2018/0305874 A1* | 10/2018 | Yamamoto | ........... | G01R 33/063 |
| 2019/0128704 A1* | 5/2019 | Tada | ............... | G01D 5/2073 |
| 2019/0356165 A1* | 11/2019 | Jacobson | ............. | H01F 27/324 |

\* cited by examiner

CALIPER TOOL AND SENSOR FOR USE IN HIGH PRESSURE ENVIRONMENTS

BACKGROUND OF THE DISCLOSURE

Boreholes drilled into subterranean formations may enable recovery of desirable fluids (e.g., hydrocarbons) using any number of different techniques. In formation evaluation operations, a measurement assembly may operate and/or function to determine the shape of a borehole. During operations, it is often desired to determine dimensions of the wellbore. A caliper tool may be utilized to measure the size and shape of the wellbore along the depth of the wellbore. It is desirable to generate the most accurate measurement of the borehole geometry possible using the most reliable and efficiently packaged tool design possible. However, current methods and systems with calipers may not achieve this.

BRIEF DESCRIPTION OF THE DRAWINGS

These drawings illustrate certain aspects of some examples of the present disclosure and should not be used to limit or define the disclosure.

DETAILED DESCRIPTION

Systems and methods disclosed below may relate in general to a caliper tool for use in a wellbore, and more particularly, for example and without limitation, to methods and apparatuses to determine a wellbore shape in a high-pressure environment. During wellbore operations, a caliper tool may be used to determine the size and shape of the wellbore. Parameters of an open or uncased wellbore from the caliper tool may be used to determine properties of the formation. Further, parameters of a cased wellbore from the caliper tool may be used to determine properties and condition of casing, such as corrosion or other damage to the casing.

In examples, a measuring device, such as a caliper tool, may measure the variation in wellbore shape as the measuring device passes through the wellbore, using one or more articulated arms that push or engage against the wellbore walls. The articulated arms may rotate to engage against the wellbore walls.

In some examples, movement of the articulated arms is measured by a sensor. Some sensors may use contact with the arms to measure the movement of the arm and the resulting wellbore shape. Contact sensors may use a dynamic seal to allow movement of the articulating arm while preventing wellbore fluid from entering the sensor. In examples, a dynamic seal may not be able to reliably withstand high pressure environments, for example, in excess of 30,000 psi.

An aspect of at least some examples disclosed herein is the realization that by utilizing a non-contact sensor arrangement, a caliper tool may be able to withstand high pressure environments. Another aspect of at least some examples disclosed herein is the realization that by utilizing a non-contact sensor arrangement, the size of the sensor assembly may be reduced. Another aspect of at least some examples disclosed herein is the realization that by avoiding the use of dynamic seals, the design of the caliper tool may be simplified.

Figure 1:
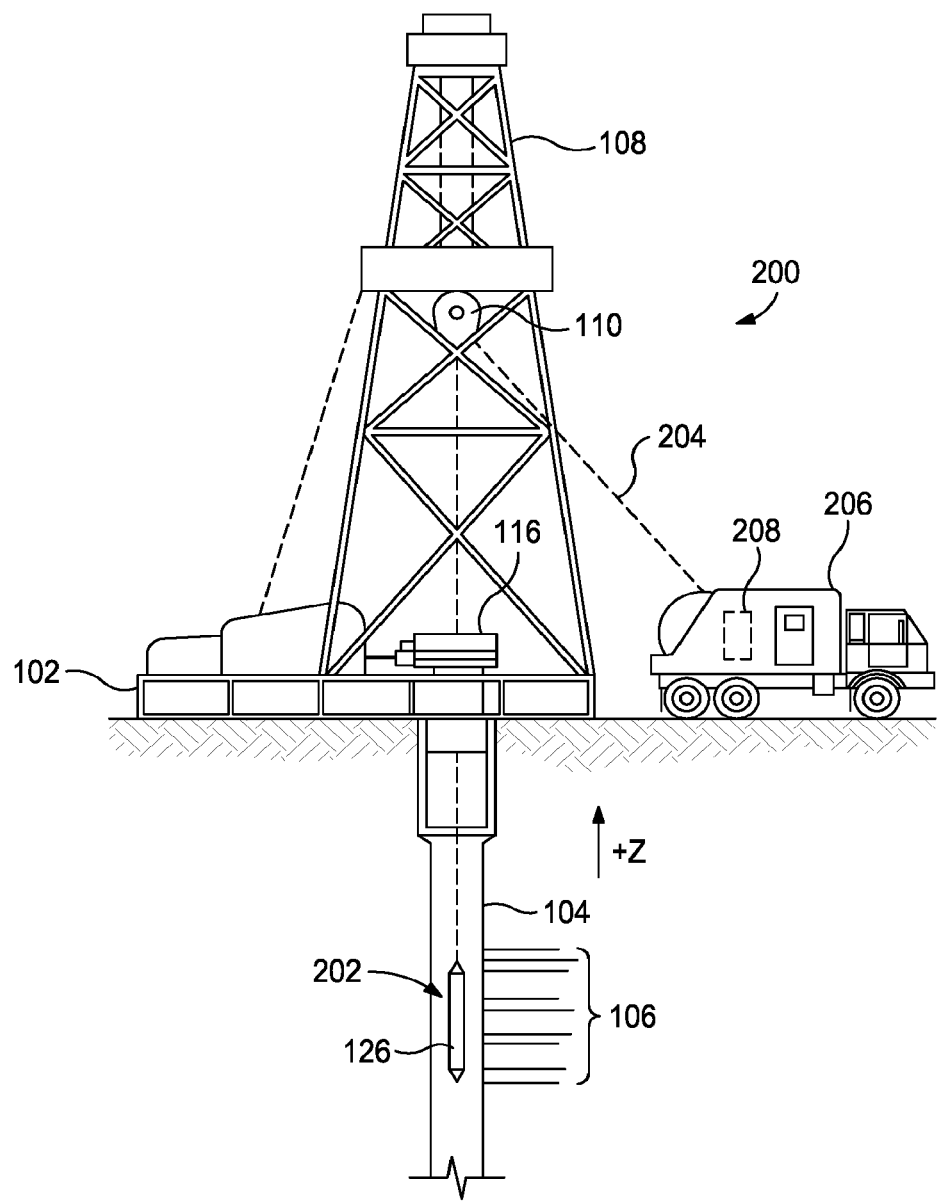
FIG. 1 depicts a schematic diagram of an exemplary wireline system that may employ the principles of the present disclosure, according to some examples.

FIG. 1 depicts a schematic diagram of an exemplary wireline system 200 that may employ the principles of the present disclosure, according to one or more examples. As illustrated, the wireline system 200 may be utilized with a drilling system having a drilling platform 102 positioned at the Earth's surface and a wellbore 104 that extends from the drilling platform 102 into one or more subterranean formations 106. The drilling platform 102 may support a derrick 108 and have a traveling block 110 for raising and lowering a drill string (not shown) as it is lowered through a rotary table. The wireline system 200 may be used to conduct measurement/logging operations within the wellbore 104 created by the drilling system.

As illustrated, the wireline system 200 may include a wireline instrument sonde 202 that may be suspended into a wellbore 104 by a conveyance 204. The wireline instrument sonde 202 may include the logging tool 126, which may be communicably coupled to the conveyance 204. The conveyance 204 may include a cable with conductors for transporting power to the wireline instrument sonde 202 and also facilitate communication between the surface and the wireline instrument sonde 202.

The logging tool 126 may include a plurality of sensing elements capable of determining wellbore parameters, including mechanical properties of the formation. In some examples, the logging tool 126 may include a caliper tool to measure the size and shape of the wellbore according to one or more examples.

As the wireline tool is conveyed through the formations 106, the logging tool 126 may collect mechanical properties of the formations 106. The logging tool 126 and other sensors of the wireline tools may be communicably coupled to a telemetry module used to transfer measurements and signals from downhole to a surface receiver (not shown) and/or to receive commands from the surface receiver. The telemetry module may encompass any known means of downhole communication including, but not limited to, a wired communications system. In certain examples, some or all of the measurements taken by the logging tool 126 may be stored within the logging tool 126 or the telemetry module for later retrieval at the surface upon retracting the string 112.

Figure 2:
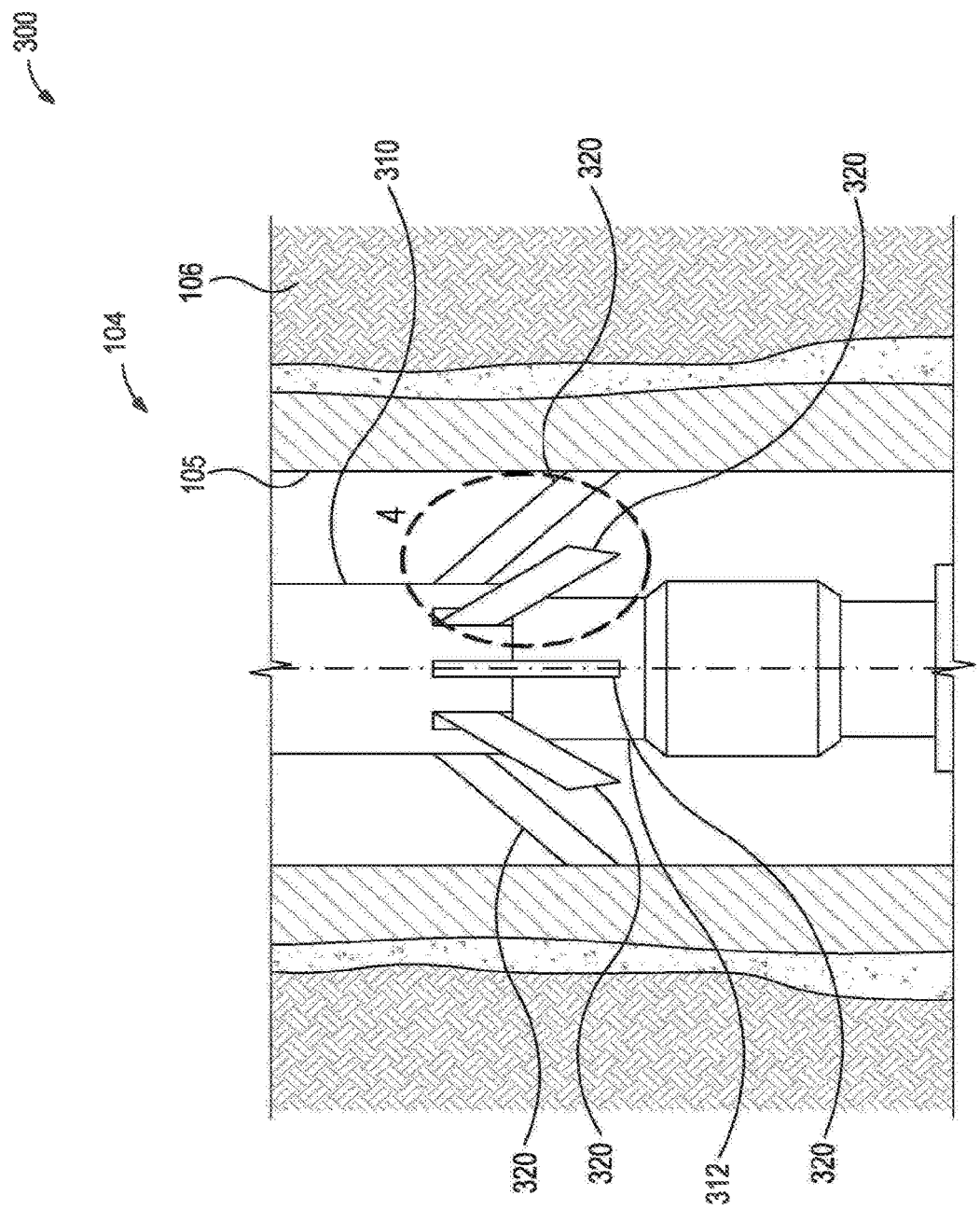
FIG. 2 is a partial cross-sectional view of a caliper tool, according to some examples.

A logging facility 206, shown in FIG. 2 as a truck, may collect measurements from the logging tool 126, and may include computing facilities 208 for controlling, processing, storing, and/or visualizing the measurements gathered by the logging tool 126. The computing facilities 208 may be communicably coupled to the logging tool 126 by way of the conveyance 204.

FIG. 2 is a partial cross-sectional view of a caliper tool 300, according to some examples. As illustrated, the caliper tool 300 may be deployed via a wireline system to measure the shape of the wellbore 104. It should be noted that caliper tool 300 may measure the shape of wellbore 104 in a cased hole or open hole. A cased hole may include casing 105, as illustrated in FIG. 2, where an open hole is exposed rock from formation 106, as illustrated in FIG. 1. In a cased hole, as illustrated in FIG. 2, the caliper tool 300 may be used to identify damage, wear, or variation of the inner diameter of the casing 105 from a nominal inner diameter of the casing 105 (drift). In some examples, the caliper tool 300 may be used with an open wellbore to determine properties of the formation 106.

In the depicted example, the caliper tool 300 includes one or more measurement components 320 extending from the tool housing 310. The caliper tool 300 may extend the measurement components 320 toward the wellbore 104 until the measurement components 320 each contact the wellbore 104 to measure the distance from the tool housing 310 and determine the shape or diameter of the wellbore 104 at the location of the caliper tool 300. In some examples, the measurement components 320 may be urged or biased towards to the wellbore 104.

In some examples, the measurement components 320 are pivotally attached to the tool housing 310. Therefore, the measurement components 320 may extend from the tool housing 310 and rotate relative to the tool housing 310. As the measurement components 320 are articulated to contact the wellbore 104, the rotation of the measurement components 320 at the pivot may be measured to determine the distance of the tool housing 310 from the wellbore 104 and in turn the shape or diameter of the wellbore 104. As described herein, the caliper tool 300 may include one or more sensors to provide a measurement of the rotation of the measurement components 320 to provide a measurement of the wellbore 104, tubing, or completion geometry.

The caliper tool 300 may be conveyed downhole into the wellbore 104 with the measurement components 320 in a retracted position within a caliper recess 312. When a measurement of the wellbore 104 is desired, the measurement components 320 may be deployed to extend from the tool housing 310 toward the wellbore 104. The caliper tool 300 may be conveyed uphole with the measurement components 320 extended to measure the shape of the wellbore 104 along the depth of the wellbore 104. In some examples, the caliper tool 300 may be used to deploy sensors and actuators to a desired location within the wellbore 104. For example, a sensor or actuator may be disposed on a measurement component 320 to be affixed or otherwise disposed to a desired location of the wellbore 104 upon extension of the measurement component 320.

Figure 3:
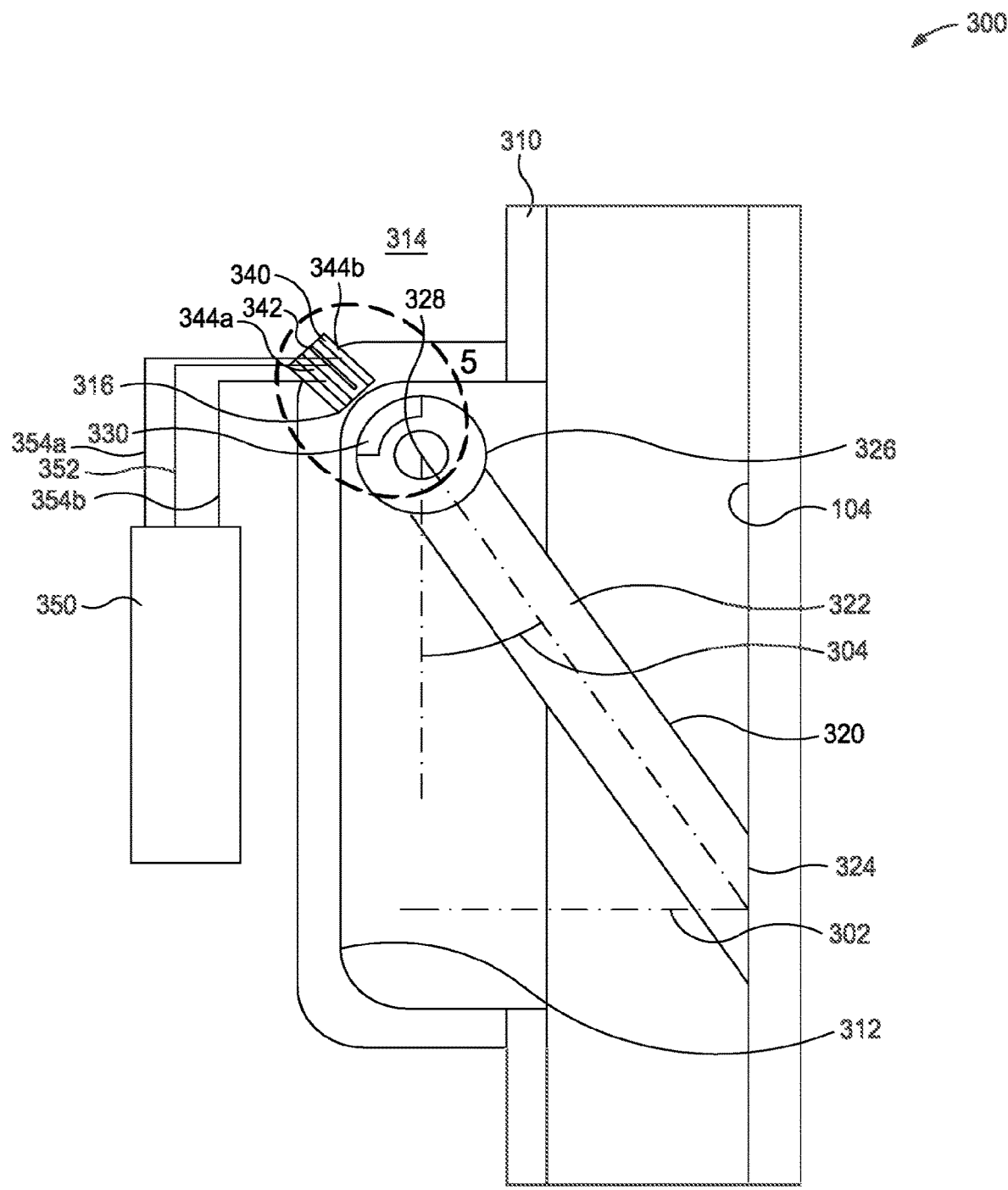
FIG. 3 is a cross-sectional view of a caliper tool of FIG. 2, according to some examples.

FIG. 3 is a cross-sectional view of the caliper tool 300 of FIG. 2, according to some examples. As illustrated, the measurement component 320 includes an upper measurement arm 322 extending radially from a hub 326. The hub 326 is rotatably coupled to the tool housing 310 about a pivot axis 328 to allow the measurement arm 322 and hub 326 to rotate about the pivot axis 328 relative to the tool housing 310. In some examples, the measurement arm 322 is biased outward toward the wellbore 104 by a spring or other bias member acting against the measurement arm 322 or the hub 326.

As the caliper tool 300 is conveyed within the wellbore 104 and the shape of the wellbore 104 changes, the end portion 324 of the measurement arm 322 may move radially inward toward the caliper recess 312 or radially outward away from the tool housing 310 as the distance 302 between the wellbore 104 and tool housing 310 varies. Similarly, as the end portion 324 moves in response to the shape of the wellbore 104, the pivot angle 304 of the measurement arm 322 and the hub 326 may vary.

In some examples, the surface area of the end portion 324 contacting the wellbore 104 may be increased to decrease the response of the measurement arm 322 to variations in the wellbore shape 104 across the length of the end portion 324. Similarly, the surface area of the end portion 324 contacting the wellbore may be decreased to increase the response of the measurement arm 322 to variations in the wellbore shape 104 across the length of the end portion 324.

By measuring the pivot angle 304 of the measurement component 320 and by utilizing the known dimensions of the measurement component 320 and the tool housing 310, the shape of the wellbore 104 may be determined. In the depicted example, a sensor assembly 340 is used to measure the pivot angle 304 of the measurement component 320 to determine the shape of the wellbore 104. As shown, a magnetically-permeable target 330 is coupled to the hub 326 to rotate with the hub 326 to reflect the pivot angle 304. In examples, target 330 may have a body that has a shape which is circular, square, rectangular, oval, and/or the like. The target 330 is used in conjunction with the sensor assembly 340 to measure the pivot angle 304. In some examples, the material of the hub 326 may have a lower magnetic permeability to provide contrast to the magnetically-permeable target 330.

Figure 4:
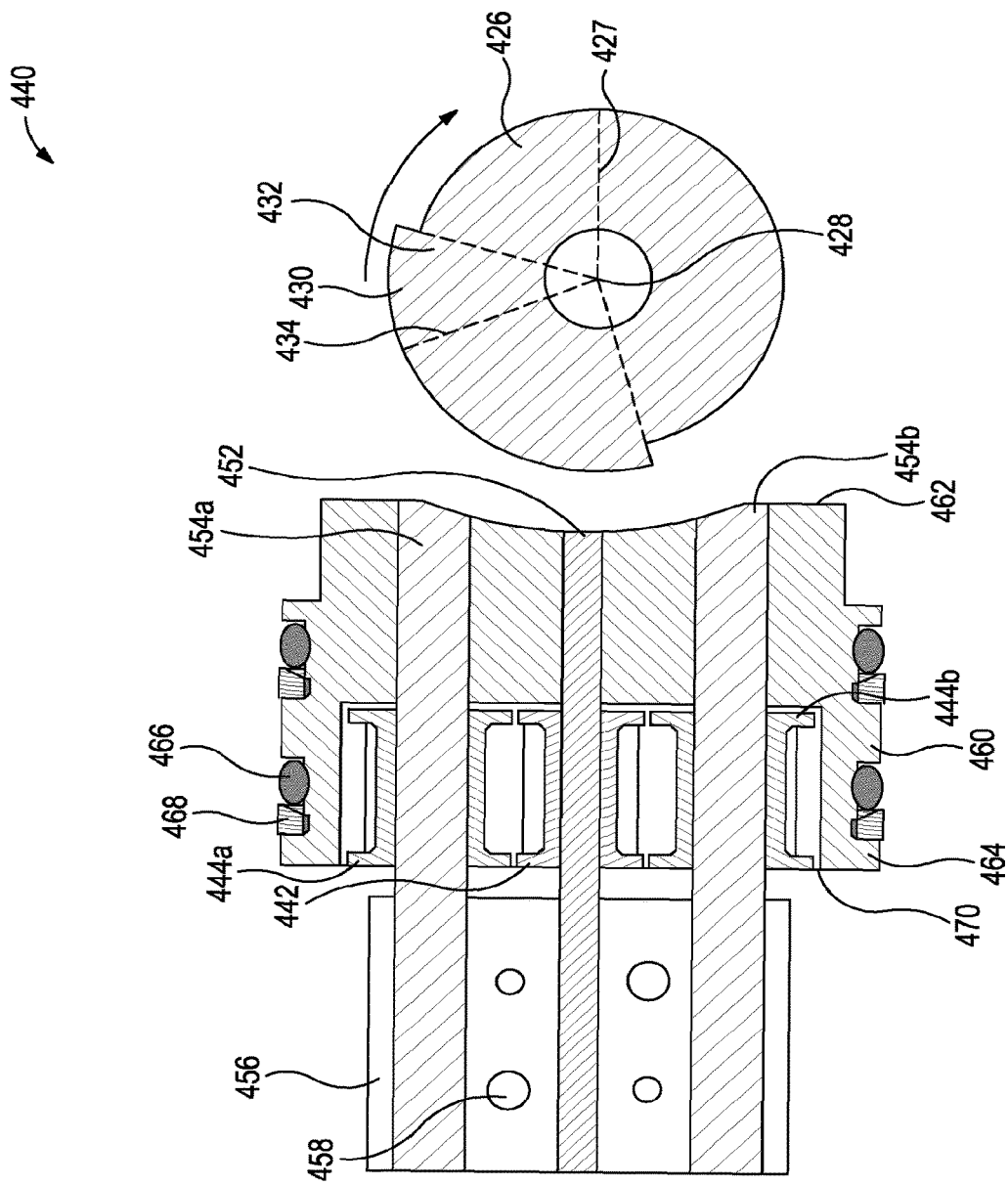
FIG. 4 is a cross-sectional view of the sensor assembly of FIG. 3, according to some examples.

In some examples, the target 330 forms part of an inductive coupling between a primary electrical coil 342, and two secondary coils 344a, and 344b of the sensor assembly 340, resulting in output signals from the sensor assembly 340 that vary in response to the rotational position of the target 330 about the pivot axis 328. For example, the target 330, the primary coil 342, and the secondary coils 344a, and 344b may be configured as a rotary variable differential transformer (RVDT). During operations, RVDTs may be utilized with brushless DC motors called "resolvers." RVDTs in conjunction with the brushless DC motors may be used to measure an angle of the rotor within the stator of the brushless DC motor. As the brushless DC motor operates in clean hydraulic oil, the coils within the brushless DC motors may be arranged in 360 degrees around the shaft of the brushless DC motor. It should be noted that in an RVDT configuration, secondary coils 344a and 344b may be positioned differently with respect to pivot axis 328. Additionally, as described in further detail below, FIGS. 3 and 4 illustrate magnetically permeable rods that pass through coils, rather than the coils themselves.

For example, when configured as an RVDT, the sensor assembly 340 may function as an electromagnetic transducer that provides one or more variable alternating currents that are proportional to the angular displacement of the target 330 relative to the sensor assembly 340. During operation, a controller 350 may provide a known alternating current excitation to the primary coil 342 via a wire pair 352. In some examples, the alternating current excitation may have a frequency in the range of 500 Hz to 2000 Hz and may be selected to provide a desired excitation strength, power efficiency, inductive coupling sensitivity, sensitivity to the surrounding environment and overall signal to noise ratio. The target 330 may inductively couple the primary coil 342 to the secondary coils 344a and 344b, wherein the amount of mutual inductance between the primary coil 342 to the secondary coil 344a and the primary coil 342 to the other secondary coil 344b varies in proportion to the pivot angle 304 of the target 330. The target 330 may be formed from a magnetically permeable material, including, but not limited to ferrite or nickel-iron-molybdenum or other ferrous alloy, to provide mutual inductance between the coils.

By varying the mutual inductance between the primary coil 342 to the secondary coils 344a and 344b, the output voltage signals of the secondary coils 344a and 344b each vary in proportion to the pivot angle 304 of the target 330. In the depicted example, the controller 350 may receive the output voltage signals from the secondary coils 344a 344b via wire pairs 354a and 354b, respectively. The controller 350 may utilize digitizer or demodulation functionality to compare a ratio or other combination of the output voltage signals from the secondary coils 344a and 344b to determine the pivot angle 304 of the target 330. In some examples, the controller 350 may utilize a temperature sensor to correct for temperature variations that may affect magnetic permeability and other characteristics of the components of the sensor assembly 340 and the target 330. In some examples, the controller 350 may utilize a pressure sensor to correct for pressure variations that may affect magnetic permeability and other characteristics of the components of the sensor assembly 340 and the target 330.

Without limitation, the use of sensor assembly 340 eliminates the use of permanent magnets, brushes or any contact between the sensor assembly 340 and the target 330, permitting long service life, high accuracy across wide temperature ranges, and reduced sensor size. Further, the use of sensor assembly 340 may eliminate the need for mechanical linkages, dynamic seals, and compensation systems, further reducing complexity and measurement error and increasing reliability.

As the target 330 may be inductively coupled without any mechanical contact to the components of the sensor assembly 340, the target 330 may be disposed outside of the tool housing 310 while the sensor assembly 340 may be disposed within the tool housing 310. In some examples, the sensor assembly 340 is at least partially disposed within the tool cavity 314. In some examples, the sensor assembly 340 is disposed or retained within a sensor port 316 of the tool housing 310.

In the depicted example, the tool housing 310 includes a non-magnetic material, including, but not limited to low permeability stainless steel, Inconel or a titanium alloy to minimize direct inductive coupling between the primary coil and the secondary and tertiary coils, except via the target, as described herein. As the sensor assembly 340 is disposed within the tool housing 310 and the target 330 is disposed outside of the tool housing 310, dynamic sealing between the target 330 and the sensor assembly 340 may not be required. Without limitation, by eliminating the use of dynamic seals, the caliper tool 300 may withstand high pressure environments in excess of 35,000 psi without the need for pressure compensation or complex tool or sensor design.

FIG. 4 is a cross-sectional view of the sensor assembly 440 of FIG. 3, according to some examples. In the depicted example, sensor assembly 440 includes one or more high-magnetic-permeability extensions to facilitate inductive coupling between the coils and the target 430 while allowing for a compact sensor assembly 440. As illustrated, a magnetically-permeable primary extension 452 extends through the primary coil 442 towards an interface end 462 of the sensor body 460 proximal to the target 430. Similarly, in some examples, magnetically-permeable secondary and tertiary extensions 454a and 454b extend through the secondary coils 444a and 444b, respectively, toward an interface end 462 of the sensor body 460 proximal to the target 430. Without limitation, the shape of magnetically-permeable primary extension 452 and secondary and tertiary extensions 454a and 454b may be cylindrical in shape, may be disk in shape, may be flat, and/or the like.

Without limitation, in accordance with some examples is the realization that the magnetically-permeable extensions 452, 454a, and 454b allow for the target 430 to reliably inductively couple the primary coil 442 to the secondary coils 444a and 444b at a greater distance than coils with an airgap to the target 430 by minimizing magnetic leakage. By minimizing the airgap to the target 430, the signal to noise ratio may be improved and sensor variation due to any magnetic properties of borehole fluid may be reduced.

In some examples, the use of magnetically-permeable extensions 452, 454a, and 454b permits flexibility in the location of the primary 442 and secondary coils 444a, and 444b within the sensor body 460. For example, the primary coil 442 and secondary coils 444a, and 444b may be spaced apart angularly along the pivot axis 428 to provide for sensor signals that are proportional to the rotation of the target 430.

Further, the use of magnetically-permeable extensions 452, 454a, and 454b allow for the primary coil 442 and secondary coils 444a, and 444b to be disposed away from the interface end 462 of the sensor body 460 to improve the rigidity and high pressure resistance of the sensor assembly 440. In some examples, the primary coil 442 and secondary coils 444a, and 444b are disposed within a coil cavity 470 adjacent to the mounting end 464 of the sensor body 460, which may permit the coils to be disposed within the tool cavity of the tool housing. In some examples, the primary coil 442 and secondary coils 444a, and 444b are encased in a polymer or elastomeric housing and are exposed to borehole pressure.

In the depicted example, the magnetically-permeable extensions 452, 454a, and 454b may include cylindrical rods that extend through the primary coil 442 and secondary coils 444a, and 444b, respectively. In some examples, the ends of the magnetically-permeable extensions 452, 454a, and 454b proximal to the target 430 may be rounded, tapered or flattened to increase the effective surface area at the interface end 462. In some examples, the ends of the magnetically-permeable extensions 452, 454a, and 454b proximal to the target 430 may have a larger diameter flange, which may reduce stress on the extensions as pressure is applied. Optionally, the magnetically-permeable extensions 452, 454a, and 454b may include plates that extend through the primary coil 442 and secondary coils 444a, and 444b, respectively.

As illustrated, the sensor assembly 440 may be integrally formed with a non-magnetic housing material. In some examples, the primary coil 442 and secondary coils 444a, and 444b along with the magnetically-permeable extensions 452, 454a, and 454b may be arranged as desired. After arranging the coils and extensions, a non-magnetic housing material may be introduced around the coils and extensions.

In some examples, the non-magnetic housing material includes a high strength brazing filler that is brazed to form the sensor body 460 around the coils and extensions. Additionally, a pressure seal may be formed between magnetically-permeable extensions 452, 454a, and 454b and the non-magnetic housing material. This may be formed by seating the large diameter flange of magnetically-permeable extensions 452, 454a, and 454b on a shoulder within the non-magnetic housing and brazening the end of the large diameter flange and the shoulder. Additionally, the pressure seal between magnetically-permeable extensions 452, 454a, and 454b and the non-magnetic housing material may allow for position measurement in extreme environments. The pressure seal may allow electronics to be enclosed at ambient pressure, which may allow for linear displacement measurements as well as rotary measurements.

In some examples, the non-magnetic housing material includes a powdered metal that is introduced around the coils and extensions. The powdered metal may be sintered to form the sensor body 460 around the coils and extensions. Without limitation, the methods described herein may form a sensor body 460 comprising a structural billet to increase overall strength. In some examples, after a brazing or sintering operation, the sensor assembly 440 may be annealed to restore the magnetic-permeable properties of the magnetically-permeable extensions 452, 454a, and 454b.

As illustrated, the sensor body 460 may be formed or shaped to fit into the sensor port of the tool housing. In some examples, the sensor body 460 may include threads or other attachment mechanisms to facilitate attachment of the sensor body 460 to the caliper tool. Optionally, the sensor body 460 may include one or more O-rings 466 captured in circumferential grooves 468 to maintain a high pressure seal within the tool body.

Optionally, the sensor assembly 440 may include a magnetic shunt 456 disposed around the distal ends of the magnetically-permeable extensions 452, 454a, and 454b. The magnetic shunt 456 may be used to adjust the amount of magnetic flux passing through the magnetically-permeable extensions 452, 454a, and 454b. In some examples, the magnetic shunt 456 may include mounting holes 458 to facilitate attachment of the sensor assembly 440 to the caliper tool. Optionally, the magnetically-permeable extensions 452, 454a, and 454b may not extend past the body 460.

In some examples, the target 430 may include geometry that allows for variable magnetic reluctance. As illustrated, the hub 426 may include a generally circular shape with a hub radius 427. The target 430 may include a sector 432 of the hub 426. The target radius 434 may vary from the hub radius 427. For example, in some examples, the target radius 434 may be greater than the hub radius 427. By altering the shape of the target 430, the inductive coupling between the target 430 and the sensor assembly 440 may be more clearly defined. In examples, target radius 434 may be the same as hub radius 427 to reduce the probability of debris getting trapped in sensor assembly 440 as the measurement arm 322 (e.g., referring to FIG. 3) rotates.

Figure 5:
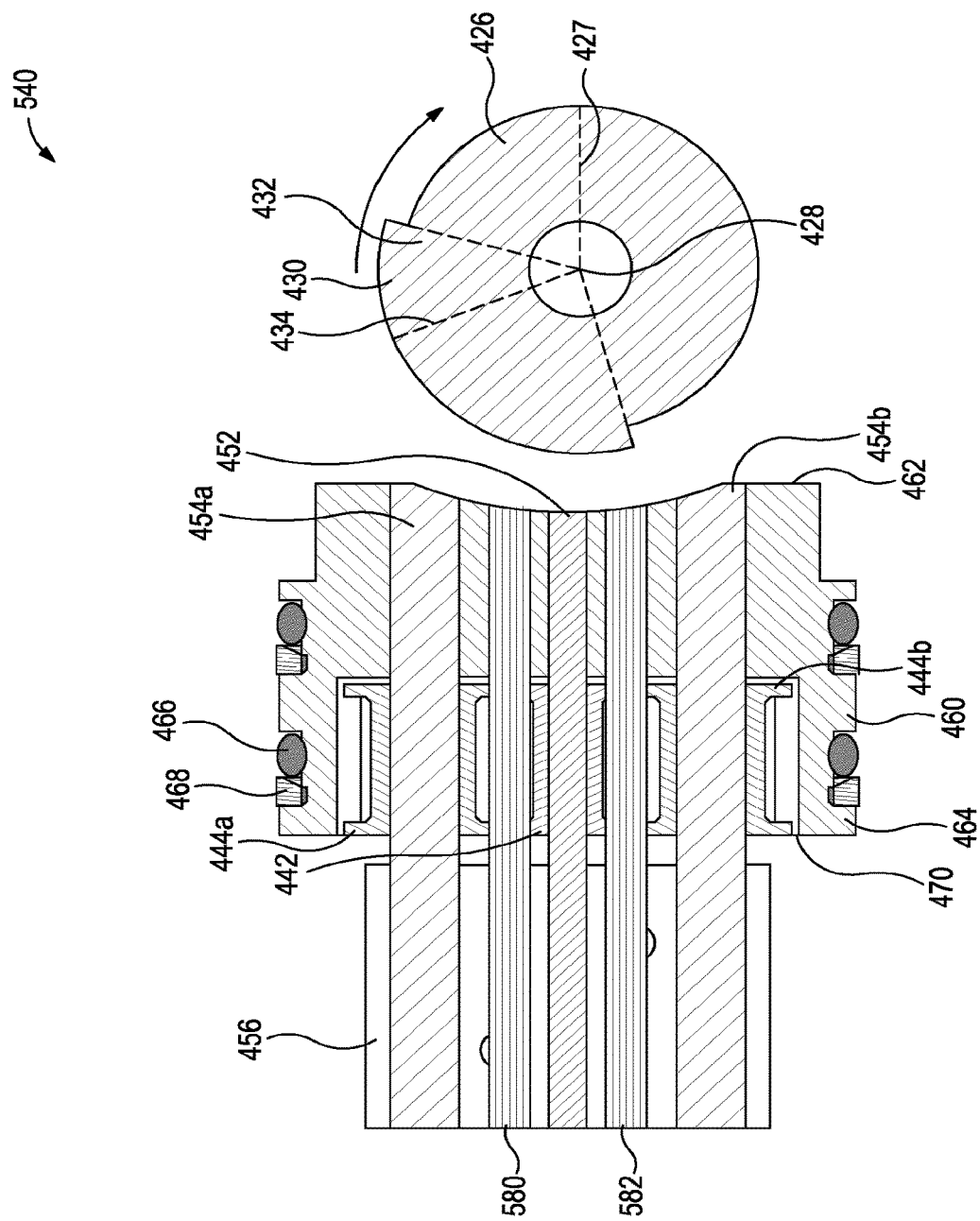
FIG. 5 is a cross-sectional view of a sensor assembly, according to some examples.

FIG. 5 is a cross-sectional view of a sensor assembly 540, according to some examples. As illustrated, the sensor assembly 540 is similar to the sensor assembly 440 previously described with reference to FIG. 4, but further includes a first magnetic shield 580 and a second magnetic shield 582 disposed between the magnetically-permeable extensions 454a, 452, and 454b to prevent crosstalk between the extensions and promote inductive coupling at the end proximal to the target 430. Optionally, the sensor assembly 540 may include only the first magnetic shield 580 or the second magnetic shield 582.

In some examples, the magnetic shields 580 and 582 may be barriers formed from conductive materials that generate eddy currents in response to a changing magnetic field to effectively suppress the inductive coupling between the extensions. The magnetic shields 580 and 582 may include sheet metal, metal screens, or other suitable shielding components.

Figure 6:
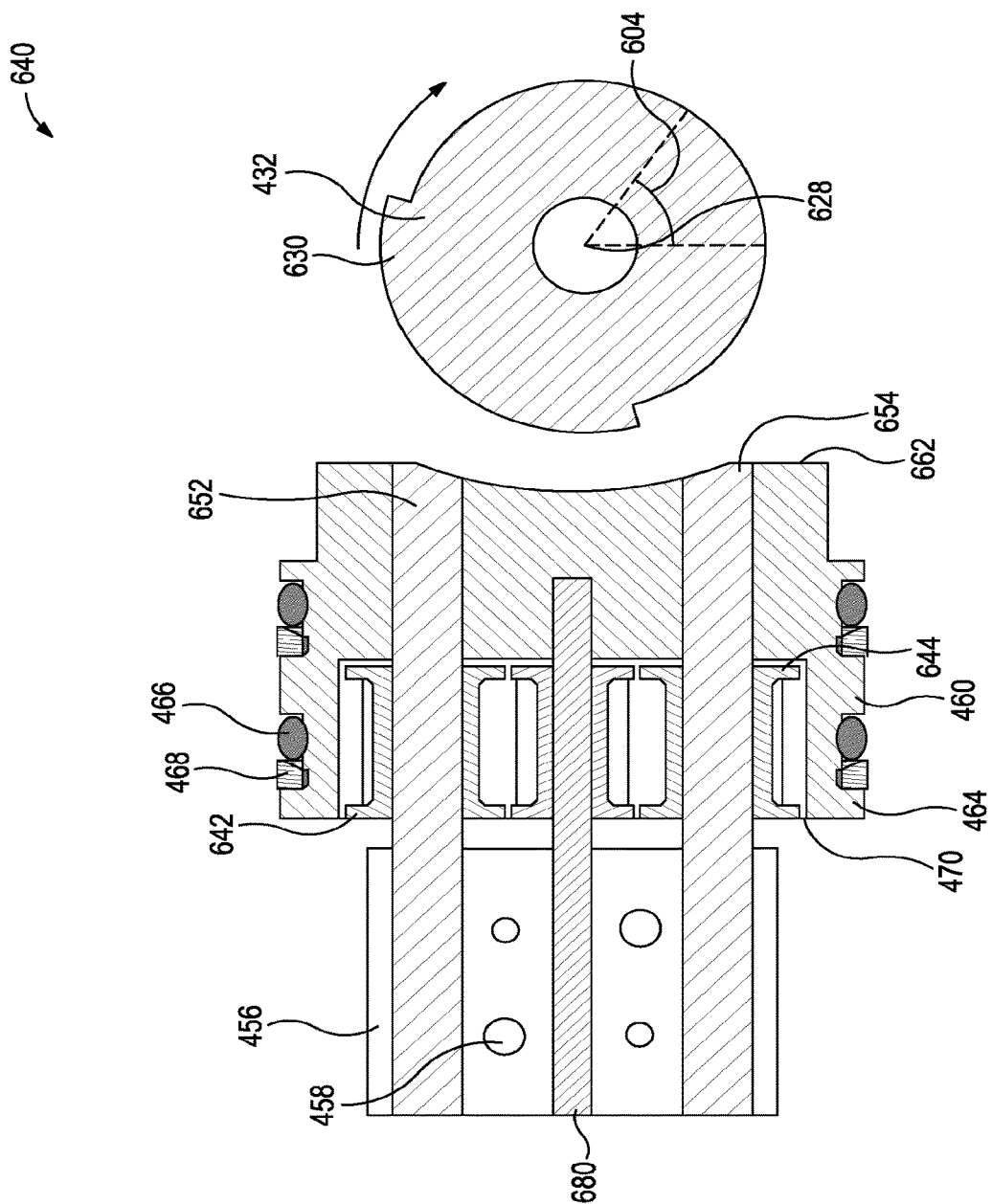
FIG. 6 is a cross-sectional view of a sensor assembly, according to some examples.

FIG. 6 is a cross-sectional view of a sensor assembly 640, according to some examples. As illustrated, the sensor assembly 640 includes some elements of the sensor assembly 440 previously described with reference to FIG. 4. In the depicted example, the sensor assembly 640 includes a primary coil 642 and a secondary coil 644 inductively coupled to a target 630, resulting in output signals from the sensor assembly 640 that vary in response to the rotational position of the target 630 about the pivot axis 628. As illustrated, the target 630, the primary coil 642, and the secondary coil 644 may be configured as a rotary variable inductance transducer (RVIT).

For example, when configured as an RVIT, the sensor assembly 640 may function as an electromagnetic transducer that provides a variable inductance that proportional to the angular displacement of the target 630 relative to the sensor assembly 640. During operation, a controller may provide a known alternating current excitation to the primary coil 642. The target 630 may inductively couple the primary coil 642 to the secondary coil 644, wherein the amount of mutual inductance between the primary coil 642 to the secondary coil 644 is proportional to the pivot angle 604 of the target 630.

By varying the mutual inductance between the primary coil 642 to the secondary coil 644, the output signals of the secondary coil 644 vary in proportion to the pivot angle 604 of the target 630. In the depicted example, a controller may receive the output signals from the secondary coil 644 to determine the pivot angle 604 of the target 630.

As illustrated, a magnetically-permeable primary extension 652 and a magnetically-permeable secondary extension 654 each extend through the primary coil 642 and a secondary coil respectively, toward an interface end 662 of the sensor body 660 proximal to the target 630.

Optionally, a magnetic shield 680 may be disposed between the magnetically-permeable extensions 652 and 654 to minimize crosstalk between the extensions and promote inductive coupling at the interface end 662 of the sensor body 660. As illustrated, the magnetic shield 680 may be spaced apart from the interface end 662. In some examples, the magnetic shield 680 may extend to the interface end 662.

Figure 7:
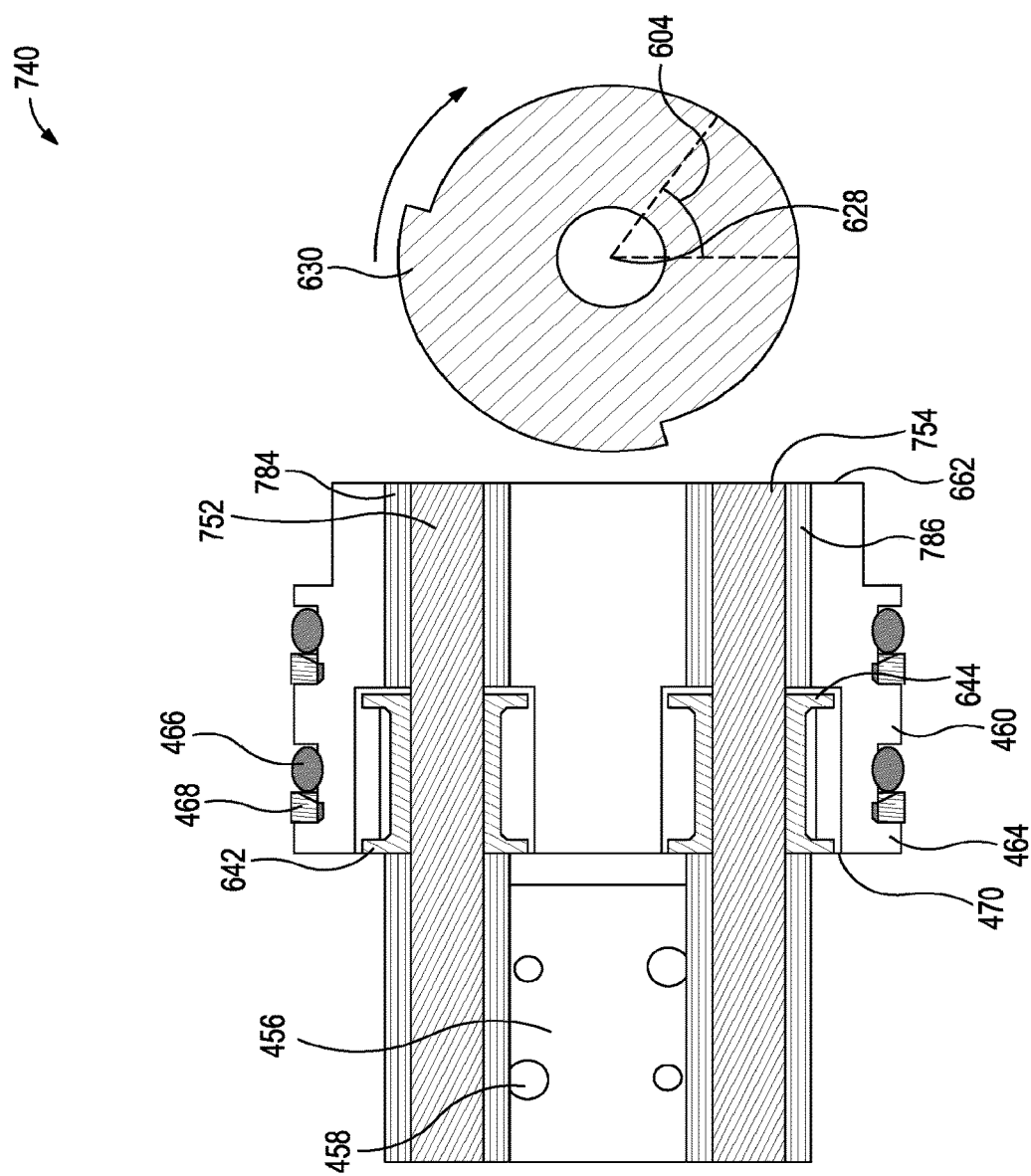
FIG. 7 is a cross-sectional view of a sensor assembly, according to some examples.

FIG. 7 is a cross-sectional view of a sensor assembly 740, according to some examples. As illustrated, the sensor assembly 740 is similar to the sensor assembly 640 previously described with reference to FIG. 6, but includes a first tubular shield 784 disposed around the primary magnetically-permeable extension 752 and a second tubular shield 786 disposed around the secondary magnetically-permeable extension 754 to minimize crosstalk between the extensions and promote inductive coupling at the end proximal to the target 730. Optionally, the sensor assembly 740 may include only the first tubular shield 784 or the second tubular shield 786.

In some examples, the tubular shields 784 and 786 may be barriers formed from conductive or magnetic materials that generate eddy currents to cancel an applied magnetic field. The tubular shields 784 and 786 may include sheet metal, metal screens, and/or metal foam.

Figure 8B:
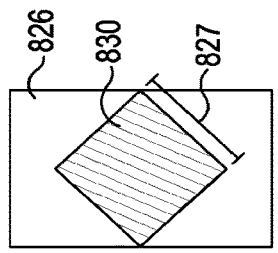
FIG. 8B is an elevation view of a hub of FIG. 8A, according to some examples.
Figure 8A:
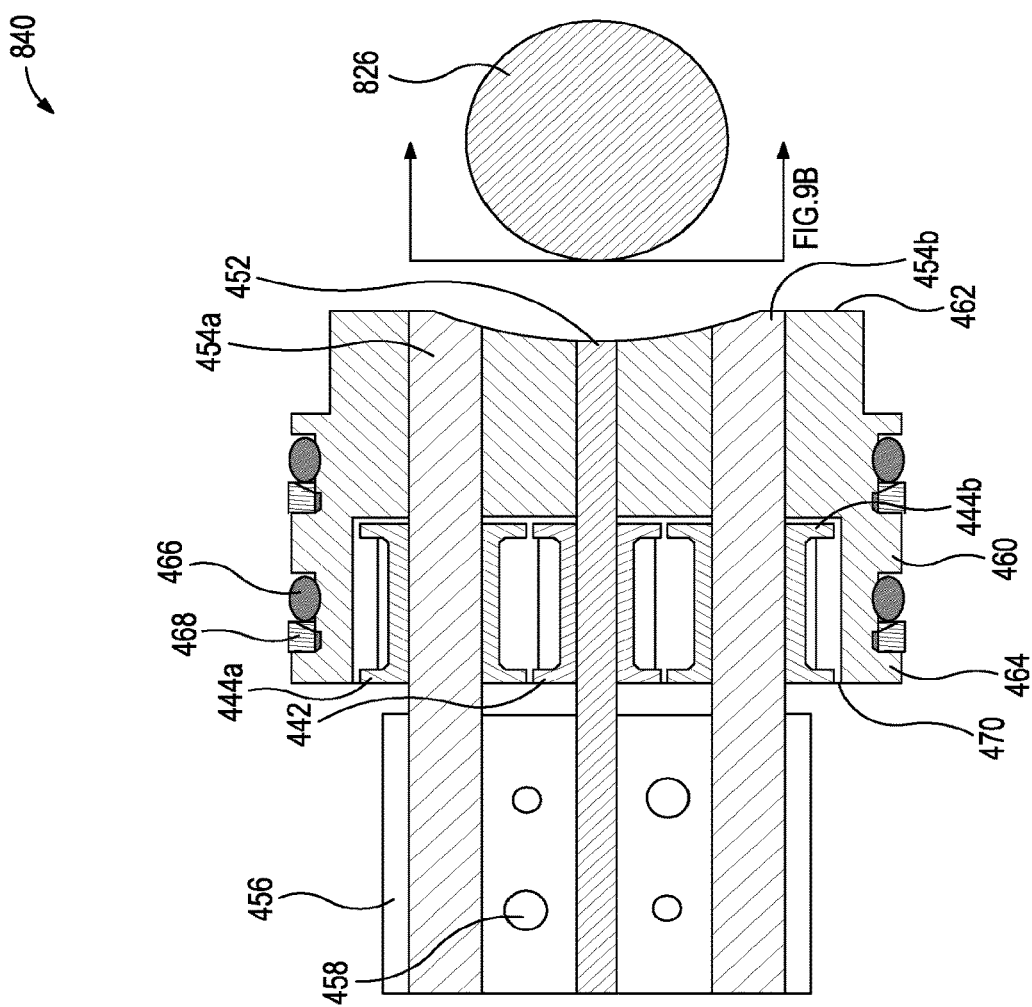
FIG. 8A is a cross-sectional view of a sensor assembly, according to some examples.

FIG. 8A is a cross-sectional view of a sensor assembly, according to some examples. As illustrated, the sensor assembly 840 includes some elements of the sensor assembly 440 previously described with reference to FIG. 4. In some examples, the hub 826 may be elliptical or include other geometry that allows for variable magnetic reluctance or variable magnetic coupling with the coils as it rotates.

FIG. 8B is an elevation view of a hub of FIG. 8A, according to some examples. As illustrated, the target 830 may include a generally diamond or triangular shape as viewed by the magnetically-permeable extensions to provide variable magnetic reluctance. In some examples, the effective width of the target 830 may vary as the hub 826 rotates. The length 827 of the sides of the target 830 may be configured to provide a desired magnetic reluctance. By altering the shape of the target 830, the inductive coupling between the target 830 and the sensor assembly 840 may be more clearly defined. In some examples, the target 830 may have a curved profile.

Figure 9:
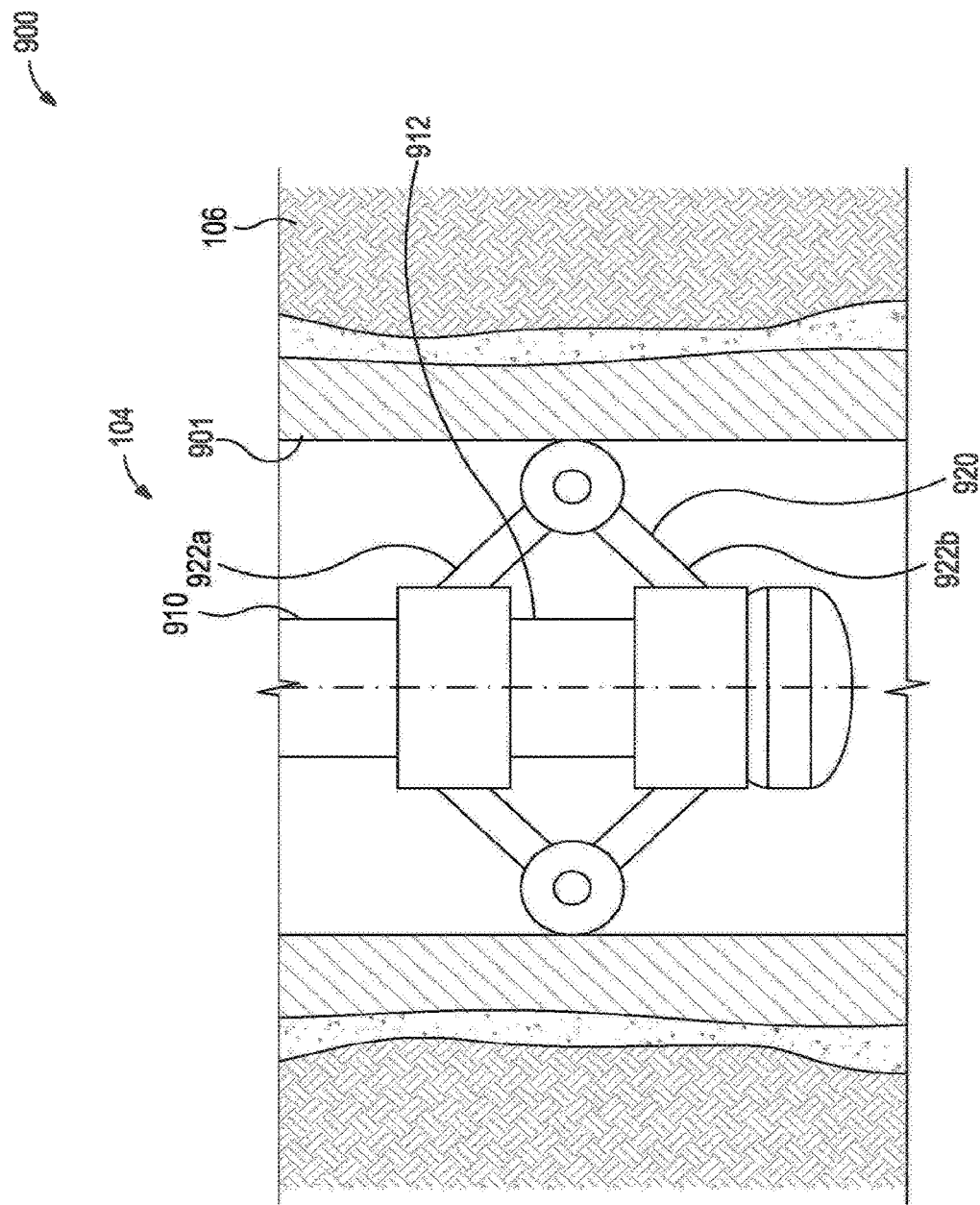
FIG. 9 is a partial cross-sectional view of a caliper tool, according to some examples.

FIG. 9 is a partial cross-sectional view of a caliper tool 900, according to some examples. As illustrated, the caliper tool 900 may be deployed via a wireline system to measure the shape of casing 901 within the wellbore 104. While FIG. 9 illustrates a cased hole including casing 901 disposed in wellbore 104, caliper tool 900 may also be deployed in an open hole, which may not include casing 901. An open hole may allow caliper tool 900 to trace the hole through formation 106 that may be formed during drilling operations.

In the depicted example, the caliper tool 900 includes one or more measurement components 920 extending from the tool housing 910, wherein the measurement components 920 include an upper measurement arm 922a and a lower measurement arm 922b pivotally coupled to each other. The caliper tool 900 may extend the measurement components 920 toward the wellbore 104 until the measurement components 920 each contact the wellbore 104 to measure the distance from the tool housing 910 and determine the shape of the wellbore 104 at the location of the caliper tool 900. In some examples, the measurement components 920 may be urged or biased towards to the wellbore 104.

In some examples, the upper measurement arm 922a is pivotally coupled to the tool housing 910 at an upper pivot and the lower measurement arm 922b is pivotally coupled to the tool housing 910 at a lower pivot. As the measurement components 320 are articulated to contact the wellbore 104, the rotation of the measurement components 320 at each pivot may be measured to determine the distance of the tool housing 910 from the wellbore 104 and in turn the shape of the wellbore 104.

Because the measurement components 920 include an upper measurement arm 922a and a lower measurement arm 922b, the caliper tool 900 may deploy the measurement components 920 as the caliper tool 900 is conveyed either uphole or downhole in the wellbore. The caliper tool 900 may be conveyed in either direction to measure the shape of the wellbore 104 along the depth of the wellbore 104.

Figure 10:
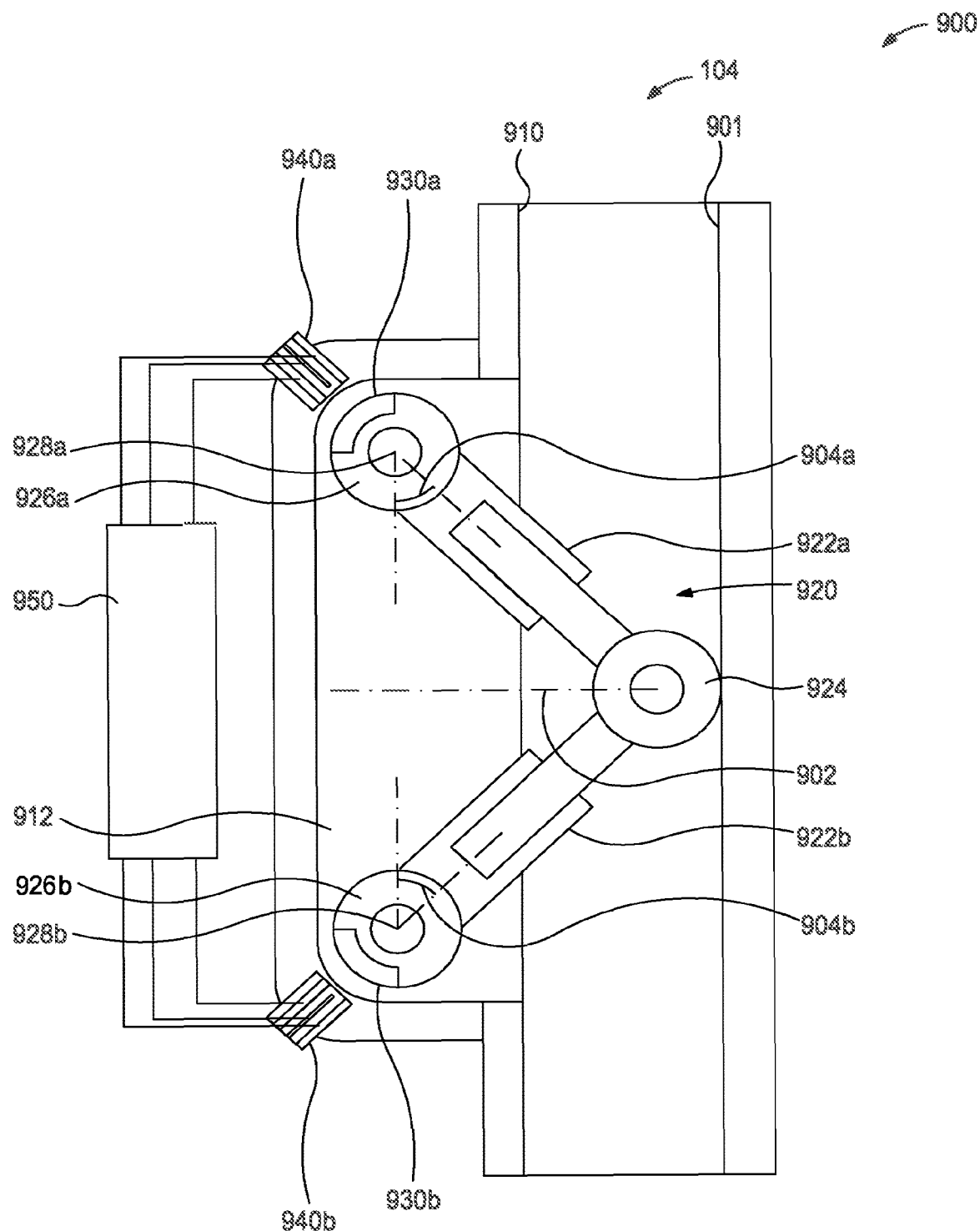
FIG. 10 is a cross-sectional view of the caliper tool of FIG. 9, according to some examples.

FIG. 10 is a cross-sectional view of the caliper tool 900 of FIG. 9, according to some examples. As illustrated, the measurement component 920 includes an upper measurement arm 922a extending radially from an upper hub 926a pivotally coupled at a central pivot 924 to a lower measurement arm 922b extending radially from a lower hub 926b. Each of the hubs 926a and 926b are rotatably coupled to the tool housing 910 about a respective pivot axis 928a and 928b to allow the upper and lower measurement arms 922a and 922b and hubs 926a and 926b to rotate about the respective pivot axis 928a and 928b relative to the tool housing 910. In some examples, the measurement component 920 is biased outward toward the wellbore 104 by a spring or other bias member to engage the central pivot 924 against the wellbore 104.

As the caliper tool 900 is conveyed within the wellbore 104 and the shape of the wellbore 104 changes, the central pivot 924 of the measurement component 920 may move radially inward toward the caliper recess 912 or radially outward away from the tool housing 910 as the distance 902 between the wellbore 104 and tool housing 910 varies. In some examples, the upper measurement arm 922a and the lower measurement arm 922b may vary in length to allow radial movement of the central pivot 924. Similarly, as the central pivot 924 moves in response to the shape of the wellbore 104, the upper pivot angle 904a of the upper measurement arm 922a and the hub 926a and the lower pivot angle 904b of the lower measurement arm 922b and the hub 926b may vary.

In some examples, the radius of the central pivot 924 contacting the wellbore 104 may be increased to decrease the response of the measurement component 920 to variations in the wellbore shape 104 across the radius of the central pivot 924. Similarly, the radius of the central pivot 924 contacting the wellbore may be decreased to increase the response of the measurement component 920 to variations in the wellbore shape 104 across the radius of the central pivot 924. During operations, central pivot 924 may move up or down axially along wellbore 104 independent from the position of caliber tool 900 in response to friction and ledges within wellbore 104. This may be more prevalent in open hole portions of wellbore 104 when a casing 901 may not be present. The independent movement of central pivot 924 may prevent the mechanism from getting jammed on ledges, obstacles, and/or the like.

By measuring the upper pivot angle 904a and the lower pivot angle 904b of the measurement component 920 and by utilizing the known dimensions of the measurement component 920 and the tool housing 910, the shape of the wellbore 104 may be determined. In the depicted example, an upper sensor assembly 940a is used to measure the upper pivot angle 904a of the measurement component 920 to determine the shape of the wellbore 104. Similarly, a lower sensor assembly 940b is used to measure the lower pivot angle 904b of the measurement component 920 to determine the shape of the wellbore 104. As shown, an upper magnetically-permeable target 930a is coupled to the upper hub 926a to rotate with the upper hub 926a to reflect the upper pivot angle 904a to the upper sensor assembly 940a. Similarly, a lower magnetically-permeable target 930b is coupled to the lower hub 926b to rotate with the lower hub 926b to reflect the lower pivot angle 904b to the lower sensor assembly 940b.

This method and system may relate in general to a caliper tool for determining a wellbore shape in a high-pressure environment and may include any of the various features of the compositions, methods, and system disclosed herein, including one or more of the following statements.

Statement 1. A caliper tool for measuring a shape of a wellbore may comprise a tool housing defining a tool cavity and a movable measurement component. The moveable measurement component may comprise a hub rotatably coupled to the tool housing at a pivot axis and an upper measurement arm extending from the hub. The caliper tool may further comprise a magnetically-permeable target, coupled to the hub, configured to rotate with the hub upon movement of the upper measurement arm; and a sensor assembly disposed within the tool cavity. The sensor assembly may comprise a primary coil inductively coupled to the target and providing a primary output signal based on a rotational position of the target relative to the tool housing. The caliper tool may further comprise a secondary coil angularly spaced apart from the primary coil relative to the hub about the pivot axis, wherein the secondary coil is inductively coupled to the target and providing a secondary output signal based on the rotational position of the target relative to the tool housing, the primary and secondary output signals facilitating measurement of a shape of the wellbore.

Statement 2. The caliper tool of statement 1, wherein the tool housing comprises a non-magnetic material.

Statement 3. The caliper tool of statements 1 or 2, wherein the target comprises a rectangular body.

Statement 4. The caliper tool of statement 3, wherein the rectangular body comprises a sector.

Statement 5. The caliper tool of statements 1-3, wherein the target comprises a diamond or triangular shaped body.

Statement 6. The caliper tool of statements 1-3 and 5, the measurement component further comprising a lower measurement arm coupled to a distal end of the upper measurement arm via a central pivot, the lower measurement arm including a lower hub disposed opposite of the central pivot, the lower hub being rotatably coupled to the tool housing at a lower pivot axis, wherein the lower hub is longitudinally spaced apart from the hub of the upper measurement arm.

Statement 7. The caliper tool of statements 1-3, 5, or 6, further comprising a magnetically-permeable primary extension extending through the primary coil, wherein a proximal end of the magnetically-permeable primary extension is disposed proximally to the target.

Statement 8. The caliper tool of statement 7, further comprising a magnetically-permeable secondary extension extending through the secondary coil, wherein a proximal end of the secondary extension is disposed proximally to the target.

Statement 9. The caliper tool of statements 1-3 or 5-7, further comprising another secondary coils angularly spaced apart from the primary coil relative to the hub about the pivot axis and opposite to the secondary coil, wherein the tertiary coil is inductively coupled to the target and providing a tertiary output signal based on the rotational position of the target relative to the tool housing, the primary, secondary, and tertiary output signals facilitating measurement of the shape of the wellbore.

Statement 10. The caliper tool of statements 1-3, 5-7, or 9, further comprising: a first magnetic shield disposed between the primary coil and the secondary coil; and a second magnetic shield disposed between the primary coil and the tertiary coil.

Statement 11. A sensor, may comprise a sensor body comprising a non-magnetic material, a primary coil disposed within the sensor body, the primary coil configured to provide a primary output signal, a secondary coil disposed within the sensor body and adjacent to the primary coil, the secondary coil configured to provide a secondary output signal, a magnetically-permeable primary extension at least partially disposed within the sensor body and extending through the primary coil, wherein a proximal end of the primary extension is disposed proximally to an interface end of the sensor body, and a magnetically-permeable secondary extension at least partially disposed within the sensor body and extending through the secondary coil, wherein a proximal end of the secondary extension is disposed proximally to the interface end of the sensor body.

Statement 12. The sensor of statement 11, wherein the magnetically-permeable primary extension is cylindrical in shape.

Statement 13. The sensor of statements 11 or 12, wherein the magnetically-permeable primary extension comprises an end portion that is flat.

Statement 14. The sensor of statements 11-13, wherein the magnetically-permeable primary extension is a disk.

Statement 15. The sensor of statements 11-14, wherein further comprising a magnetic shunt disposed around a distal end of the magnetically-permeable primary extension and the secondary extension.

Statement 16. The sensor of statements 11-15, further comprising a tubular primary magnetic shield disposed around the magnetically-permeable primary extension and a tubular secondary magnetic shield disposed around the secondary extension.

Statement 17. The sensor of statements 11-16, further comprising: a tertiary coil disposed within the sensor body, adjacent to the primary coil, and opposite to the secondary coil, the tertiary coil configured to provide a tertiary output signal; and a magnetically-permeable tertiary extension at least partially disposed within the sensor body and extending through the tertiary coil, wherein a proximal end of the tertiary extension is disposed proximally to the interface end of the sensor body.

Statement 18. A method to manufacture a sensor may comprise arranging a primary coil adjacent to a secondary coil, disposing a magnetically-permeable primary extension through the primary coil, disposing a magnetically-permeable secondary extension through the secondary coil, introducing a non-magnetic material around the primary coil, the secondary coil, and at least a portion of the primary extension and the secondary extension to form a sensor body, and annealing the primary extension and the secondary extension within the non-magnetic material.

Statement 19. The method of statement 18, wherein introducing the non-magnetic material comprises: brazing at least a part of the non-magnetic material to at least a part of a large diameter flange connected to the magnetically-permeable primary extension or the magnetically-permeable secondary extension.

Statement 20. The method of statements 18 or 19, wherein introducing the non-magnetic material comprises: sintering the non-magnetic material which is around the primary coil, the secondary coil, and at least a portion of the primary extension and the secondary extension.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A caliper tool for measuring a shape of a wellbore, comprising:
   a tool housing defining a tool cavity;
   a movable measurement component comprising:
      a hub rotatably coupled to the tool housing at a pivot axis; and
      an upper measurement arm extending from the hub;
   a magnetically-permeable target, coupled to the hub, configured to rotate with the hub upon movement of the upper measurement arm; and
   a sensor assembly disposed within the tool cavity, the sensor assembly comprising:
      a primary coil inductively coupled to the target and receiving an alternating current excitation from a controller;
      a secondary coil angularly spaced apart from the primary coil relative to the hub about the pivot axis, wherein the secondary coil is inductively coupled to the target and providing a secondary output signal based on the rotational position of the target relative to the tool housing; and
      another secondary coil angularly spaced apart from the secondary coil relative to the hub about the pivot axis, wherein the another secondary coil is inductively coupled to the target and providing another secondary output signal based on the rotational position of the target relative to the tool housing, the secondary and another secondary output signals facilitating measurement of the shape of the wellbore.

2. The caliper tool of claim 1, wherein the tool housing comprises a non-magnetic material.

3. The caliper tool of claim 1, wherein the target comprises a rectangular body.

4. The caliper tool of claim 3, wherein the rectangular body comprises a sector.

5. The caliper tool of claim 1, wherein the target comprises a diamond or triangular shaped body.

6. The caliper tool of claim 1, the measurement component further comprising a lower measurement arm coupled to a distal end of the upper measurement arm via a central pivot, the lower measurement arm including a lower hub disposed opposite of the central pivot, the lower hub being rotatably coupled to the tool housing at a lower pivot axis, wherein the lower hub is longitudinally spaced apart from the hub of the upper measurement arm.

7. The caliper tool of claim 1, further comprising a magnetically-permeable extension extending through the secondary coil, wherein a proximal end of the magnetically-permeable extension is disposed proximally to the target for inductively coupling the secondary coil to the target.

8. The caliper tool of claim 7, further comprising another magnetically-permeable extension extending through the another secondary coil, wherein a proximal end of the another magnetically-permeable extension is disposed proximally to the target for inductively coupling the another secondary coil to the target.

9. The caliper tool of claim 1, further comprising:
   a first magnetic shield disposed between the primary coil and the secondary coil; and
   a second magnetic shield disposed between the primary coil and the tertiary another secondary coil.

10. A sensor, comprising:
    a sensor body comprising a non-magnetic material and having an interface end proximal to a magnetically-permeable target;
    a primary coil disposed within the sensor body, the primary coil configured to provide a primary output signal in response to receiving an alternating current excitation from a controller;
    a secondary coil disposed within the sensor body away from the interface end of the sensor body and adjacent to the primary coil;
    a magnetically-permeable extension at least partially disposed within the sensor body and extending through the secondary coil to the interface end of the sensor body for inductively coupling the secondary coil to the target, the secondary coil configured to provide a secondary output signal based on the rotational position of the target relative to the sensor body;
    another secondary coil disposed within the sensor body away from the interface end of the sensor body, adjacent to the primary coil and angularly spaced apart from the secondary coil;
    another magnetically-permeable extension at least partially disposed within the sensor body and extending through the another secondary coil to the interface end of the sensor body for inductively coupling the another secondary coil to the target, the another secondary coil configured to provide a secondary output signal based on the rotational position of the target relative to the sensor body.

11. The sensor of claim 10, wherein one or both of the magnetically-permeable extension and the another magnetically-permeable extensions are cylindrical in shape.

12. The sensor of claim 11, wherein one or both of the magnetically-permeable extension and the another magnetically-permeable extension comprise an end portion that is flat.

13. The sensor of claim 10, wherein one or both of the magnetically-permeable extension and the another magnetically-permeable extensions are a disk.

14. The sensor of claim 10, further comprising a magnetic shunt disposed around a distal end of the magnetically-permeable extension and the another magnetically-permeable extension.

15. The sensor of claim 10, further comprising a tubular magnetic shield disposed around the magnetically-permeable extension and a tubular magnetic shield disposed around the another magnetically-permeable extension.

16. The sensor of claim 10, wherein the non-magnetic material is disposed around the secondary coil, the another secondary coil, and at least a portion of the magnetically-permeable extension and the another magnetically-permeable extension to form the sensor body.

17. The method of claim 16, wherein the non-magnetic material which is around the secondary coil, the another secondary coil, and at least a portion of the primary magnetically-permeable extension and the another magnetically-permeable extension are sintered.

18. The sensor of claim 10, wherein at least a part of the non-magnetic material is brazed to at least a part of a large diameter flange connected to the magnetically-permeable extension or the second magnetically-permeable extension.

* * * * *

UNITED STATES PATENT AND TRADEMARK OFFICE
CERTIFICATE OF CORRECTION

PATENT NO. : 11,079,211 B2
APPLICATION NO. : 16/440712
DATED : August 3, 2021
INVENTOR(S) : Edward Harrigan et al.

It is certified that error appears in the above-identified patent and that said Letters Patent is hereby corrected as shown below:

In the Claims

Column 14, Line 28, Claim 9, delete "and the secondary; and a second magnetic shield disposed between the primary coil and the tertiary another secondary coil."
And replace with --and the secondary; and a second magnetic shield disposed between the primary coil and the another secondary coil.--.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*